United States Patent
Geise

(10) Patent No.: US 7,527,318 B2
(45) Date of Patent: May 5, 2009

(54) COLLAPSIBLE VEHICLE SHELTER

(76) Inventor: David W. Geise, 3666 Lawnwood Ct., San Luis Obispo, CA (US) 93401

( * ) Notice: Subject to any disclaimer, the term of this patent is extended or adjusted under 35 U.S.C. 154(b) by 306 days.

(21) Appl. No.: 11/425,787

(22) Filed: Jun. 22, 2006

(65) Prior Publication Data
US 2007/0296240 A1    Dec. 27, 2007

(51) Int. Cl.
B60P 7/02     (2006.01)
B60P 3/39     (2006.01)

(52) U.S. Cl. ............. 296/100.06; 296/165; 296/174

(58) Field of Classification Search ......... 296/100.06, 296/156, 159, 174, 100.07, 26.01, 26.02, 296/26.12, 26.15, 26.04, 26.06, 26.07, 164, 296/165, 169, 173
See application file for complete search history.

(56) References Cited

U.S. PATENT DOCUMENTS

| | | | | |
|---|---|---|---|---|
| 3,466,082 | A | | 9/1969 | Branch |
| 3,737,190 | A | * | 6/1973 | Smith et al. ............... 296/159 |
| 3,858,744 | A | * | 1/1975 | Garvert ................... 217/60 G |
| 4,027,911 | A | * | 6/1977 | Johnson ................... 296/161 |
| 4,077,662 | A | * | 3/1978 | Kauffman ................. 296/165 |
| 4,176,873 | A | | 12/1979 | Barr et al. |
| 4,294,484 | A | | 10/1981 | Robertson |
| 4,462,631 | A | | 7/1984 | Lange |
| 4,522,441 | A | | 6/1985 | Allison |
| 4,807,924 | A | * | 2/1989 | Kottke ..................... 296/164 |
| 4,993,773 | A | * | 2/1991 | Lange ...................... 296/160 |
| 5,209,543 | A | * | 5/1993 | Harkins, Jr. ............... 296/26.06 |
| 5,462,330 | A | * | 10/1995 | Brown ..................... 296/172 |
| 6,394,531 | B2 | | 5/2002 | Thompson |
| 6,428,079 | B1 | * | 8/2002 | Van Dyke ................ 296/100.06 |
| 6,663,160 | B2 | * | 12/2003 | Yarbrough et al. ...... 296/100.06 |
| 6,679,542 | B1 | * | 1/2004 | Semotuk ................... 296/174 |
| 6,712,418 | B1 | * | 3/2004 | Lathers ................. 296/100.02 |
| 6,814,387 | B2 | * | 11/2004 | Lake ..................... 296/100.06 |
| 6,896,313 | B2 | * | 5/2005 | Mack et al. ............. 296/100.08 |
| 6,899,372 | B1 | * | 5/2005 | Keller ................... 296/100.09 |
| 6,929,303 | B1 | * | 8/2005 | Sharples ................... 296/37.6 |
| 6,932,418 | B1 | * | 8/2005 | Connell .................... 296/161 |
| 7,118,159 | B1 | * | 10/2006 | Andrews ............... 296/100.06 |
| 7,178,857 | B2 | * | 2/2007 | Williams ................... 296/173 |
| 7,246,839 | B1 | * | 7/2007 | Nyberg ................. 296/100.06 |
| 7,278,674 | B1 | * | 10/2007 | Bogard ................. 296/100.06 |
| 2002/0163221 | A1 | | 11/2002 | Smith |
| 2006/0066130 | A1 | | 3/2006 | King et al. |

* cited by examiner

*Primary Examiner*—Glenn Dayoan
*Assistant Examiner*—Gregory Blankenship
(74) *Attorney, Agent, or Firm*—Thomas F. Lebens; Sinsheimer Juhnke Lebens & McIvor, LLP

(57) ABSTRACT

A shelter attachment for a pickup truck includes a lid that is rotatably attached to one side of the pickup truck bed. As the lid is rotated in an opened direction, two wire ropes pull a shelter mast in an upward direction so that the mast is in its fully upright position when the lid is in its fully opened position adjacent to the exterior of the truck bed sidewall. An additional two wire ropes connecting the mast to the opposite truck bed sidewall provide support for the mast and the lid. When in its opened position, the interior surface of the lid forms a sleeping bed for a user. The mast and the wire ropes provide the structure for supporting the canvas or nylon sheeting material for the walls of the shelter.

24 Claims, 6 Drawing Sheets

COLLAPSIBLE VEHICLE SHELTER

FIELD OF INVENTION

This relates to camping equipment, and more particularly, to camping shelter attachments for use with pickup trucks.

BACKGROUND

Camping is a popular recreational activity, and accordingly, there are many items of camping equipment available. This equipment includes camping shelters, such as for example, tents for erection on the ground, recreational vehicles having integral shelters, and shelters for use in connection with pickup trucks. The shelters of the latter category frequently include panels and frames that are assembled on the beds of the pickup trucks so that the resulting structure incorporates a roof or other overhead protection, side walls constructed of canvas or nylon, frames for supporting the roof and side walls, and one or more sleeping beds. When not assembled to form a shelter, these components are collapsed and stored in or over the beds of the pickup trucks for traveling from one camping location to another.

There are disadvantages however with known structures for use on pickup truck beds. Some designs have a profile wherein the shelter structure, while in its stored configuration, extends above the pickup truck cab or extends behind the truck beyond the truck tail gate. This can result in reduced aerodynamic properties as well as a less than aesthetically-pleasing appearance. Other designs are not well adapted for use with so-called "short bed" pickup trucks, because they do not provide a sleeping bed of sufficient length for comfortable use by many adult users. Yet other designs require an excessive number of steps by the user to erect the collapsible structure over the pickup truck bed.

What is needed therefore is an improved, collapsible shelter attachment for use with a pickup truck that overcomes these and other disadvantages.

SUMMARY OF THE ILLUSTRATED EMBODIMENTS

Disclosed is an improved shelter having an aerodynamic, low-weight and aesthetically-pleasing profile when the shelter is closed, yet providing a quickly-assembled shelter with a comfortable sleeping area when opened. An embodiment of the invention includes a lid that is rotatably attached to one side of a pickup truck bed. As the lid is rotated in an opened direction, two wire ropes pull a shelter structural support mast in an upward direction so that the mast is in its fully upright position when the lid is in its fully opened position adjacent to the exterior of the truck bed sidewall. An additional two wire ropes connecting the mast to the opposite truck bed sidewall provide support for the mast and the lid. When in its opened position, the interior surface of the lid forms a sleeping bed for a user. The mast and the wire ropes provide the structure for supporting the canvas or nylon sheeting material for the walls of the shelter. Sufficient height is provided by the shelter for an adult user of average height to be able to stand upright on the truck bed floor within the shelter.

According to another embodiment, the shelter is for use with a pickup truck bed having a floor and first and second sidewalls. The second sidewall has a sidewall exterior surface and a sidewall interior surface. The shelter is comprised of a lid, a first member, a mast and a link member. The lid has a lid exterior surface and a lid interior surface and is adapted for attachment to the second sidewall of the truck bed. The lid is further adapted for movement between a lid first position and a lid second position.

The first member has a first member exterior surface and a first member interior surface. The first member is adapted for attachment to the lid and for movement between a first member first position and a first member second position. The lid is disposed adjacent to the sidewall exterior surface with the lid interior surface disposed generally parallel to the truck bed floor when the lid is in the lid second position. The first member interior surface is generally coplanar with the lid interior surface when the lid is in the lid second position and when the first member is in the first member second position.

The mast is adapted for attachment to the pickup truck bed and for placement in a mast first position and a mast second position. The mast is disposed in a generally upright orientation when the mast is in the mast second position. The link member is adapted for connecting the lid to the mast, for connecting the mast to the pickup truck bed, and for supporting the lid when the lid is in the lid second position.

In another aspect, the mast is adapted to be disposed between the lid interior surface and the pickup truck bed floor when the mast is in the mast first position and the lid is in the lid first position.

In another aspect, the link member being adapted for connecting the mast to the pickup truck bed includes being adapted for connecting the mast to the first sidewall of the pickup truck bed.

In another aspect, the link member is a flexible wire rope.

In another aspect, the link member is adapted for moving the mast from the mast first position to the mast second position in response to the movement of the lid from the lid first position to the lid second position.

In another aspect, the shelter further comprises second and third members. The second member is adapted for attachment to the first sidewall and for extending generally upward from the first sidewall. The link member, being adapted for connecting the mast to the pickup truck bed, includes being adapted for connecting the mast to the second member. The third member has a third member interior surface and a third member exterior surface. The third member is adapted for attachment to the second sidewall and for extending generally upward from the second sidewall. The lid, being adapted for attachment to the second sidewall, includes being adapted for attachment to the third member. The lid, being disposed adjacent to the sidewall exterior surface when the lid is in the lid second position, includes being disposed adjacent to the third member exterior surface when the lid is in the lid second position.

In another aspect, the pickup truck has a cab with a cab roof that defines an imaginary plane extending from the cab roof. The lid exterior surface is disposed either substantially coplanar with the imaginary plane or below the imaginary plane when the lid is attached to the third member and in the lid first position.

In another aspect, the link member is comprised of a first link member and a second link member. The first link member is adapted for connecting the lid to the mast, and the second link member is adapted for connecting the mast to the pickup truck bed.

In another aspect, the mast, being adapted for attachment to the pickup truck bed, includes being adapted for attachment to the second sidewall of the truck bed. The shelter further comprises a hinge assembly adapted for attachment to the second sidewall. The hinge assembly has a first movable plate adapted to rotate about a first axis and a second movable plate adapted to rotate about a second axis. The first movable plate is adapted for attachment to the lid, and the second movable plate is adapted for attachment to the mast.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
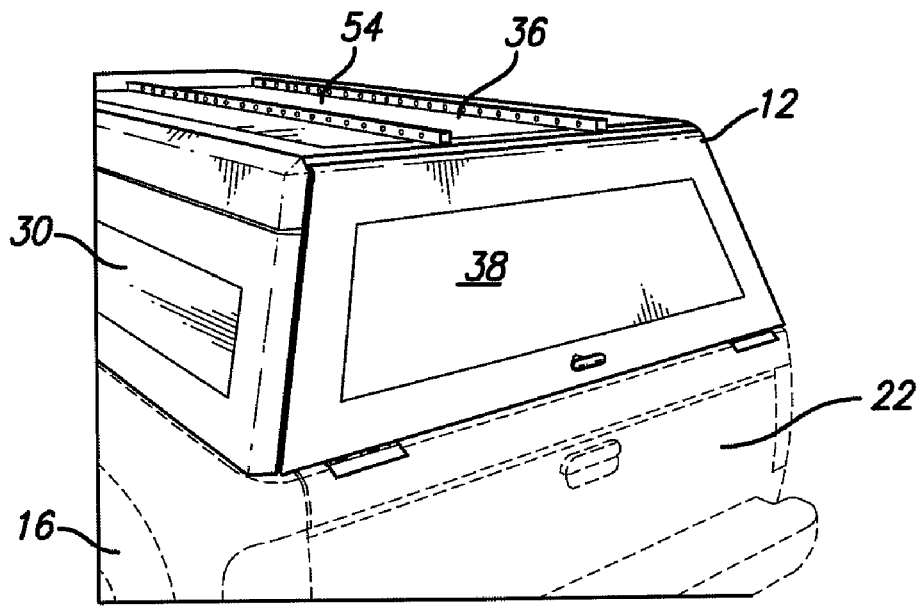
FIG. 1 is a rear perspective view of a shelter attachment in a fully closed orientation in accordance with an embodiment of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Disclosed is an improved shelter having an aerodynamic, low-weight and aesthetically-pleasing profile when the shelter is closed, yet providing a quickly-assembled shelter with a comfortable sleeping area when opened. An embodiment of the invention includes a lid that is rotatably attached to one side of a pickup truck bed. As the lid is rotated in an opened direction, two wire ropes pull a shelter mast in an upward direction so that the mast is in its fully upright position when the lid is in its fully opened position adjacent to the exterior of the truck bed sidewall. An additional two wire ropes connecting the mast to the opposite truck bed sidewall provide support for the mast and the lid. When in its opened position, the interior surface of the lid forms a sleeping bed for a user. The mast and the wire ropes provide the structure for supporting the canvas or nylon sheeting material for the walls of the shelter.

Referring to FIGS. 1-6, there is shown a collapsible shelter attachment 12 mounted on the bed 14 of a pickup truck 16. The truck bed 14 is located behind the cab 18 of the truck 16 and has a generally rectangular floor 20, a rear gate 22 rotatably attached to the floor 20, first and second sidewalls 24, 26 extending upward from the floor 20 and oriented generally parallel to one another, and a third sidewall 28 disposed at the front of the truck bed 14 and oriented transversely between the first and second sidewalls 24, 26.

Figure 4:
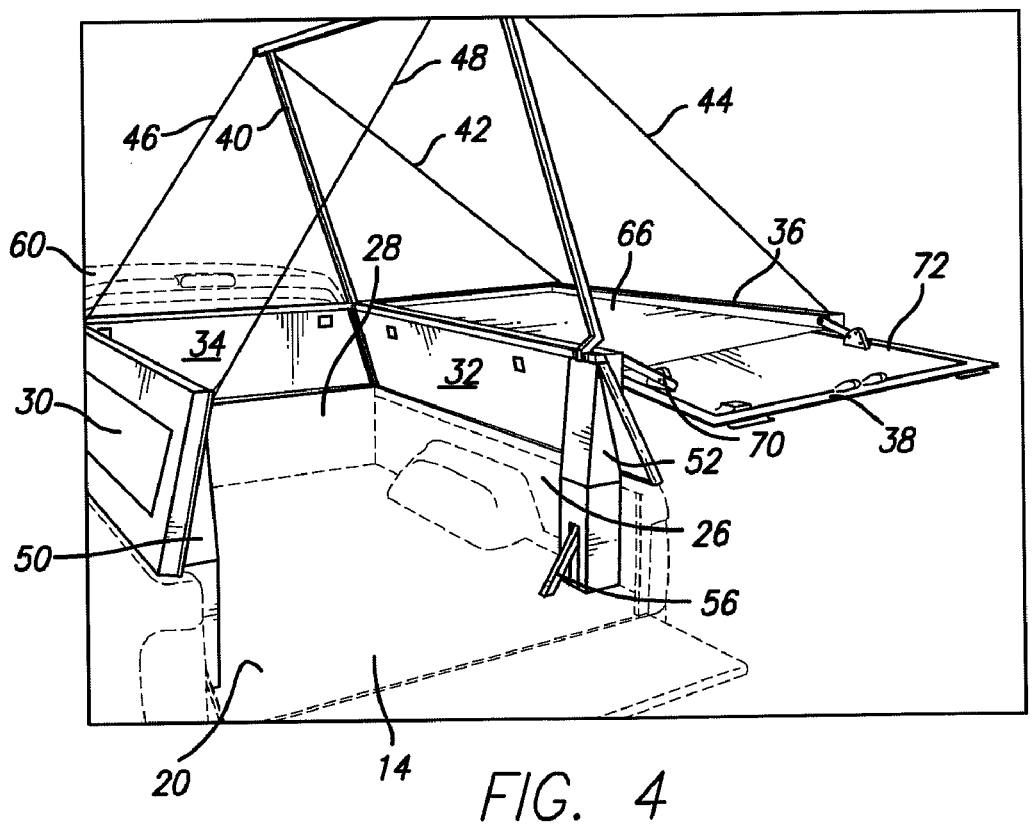
FIG. 4. is a rear perspective view of the shelter attachment of FIG. 1 in a fully opened position.
Figure 5:
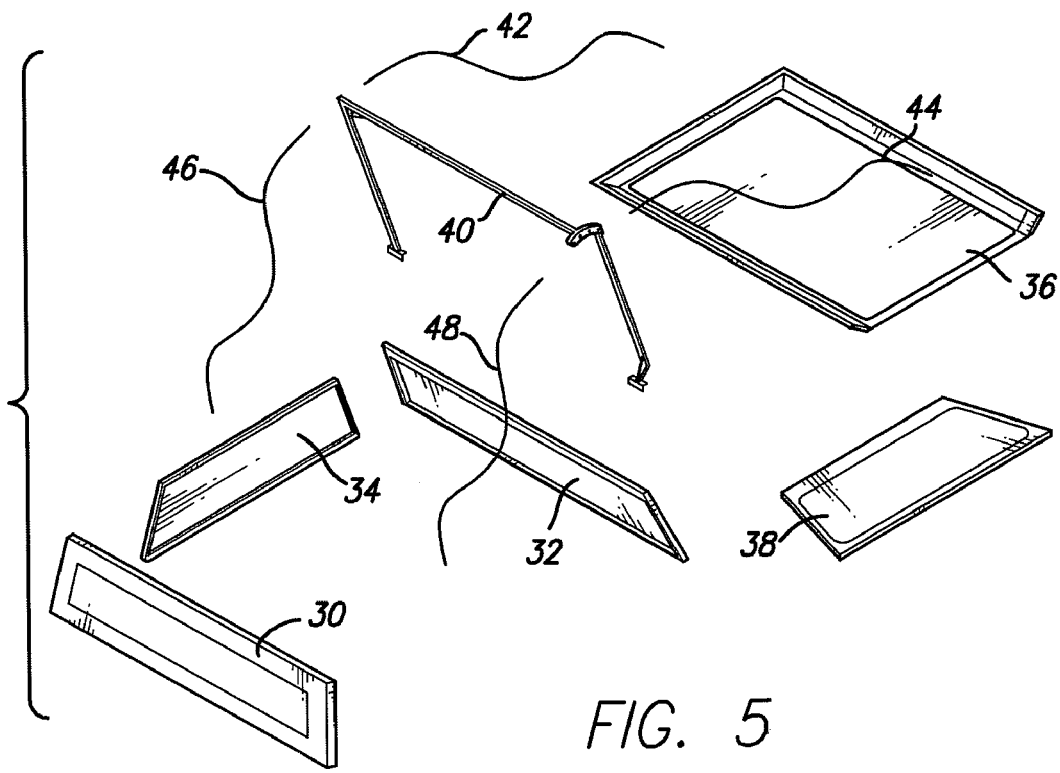
FIG. 5 is an exploded parts diagram of some of the principal components of the shelter attachment of FIG. 1.

As best seen in the exploded parts diagram of FIG. 5, some of the major components of the shelter attachment 12 include first, second and third base members or panels 30, 32, 34, a lid 36, a hatch member or panel 38, a mast 40, and four wire ropes 42, 44, 46, 48. When disassembled, these components can be stacked upon one another for compact packaging and shipping. A user can unpack these components and assemble them onto a pickup truck without excessive difficulty. While the embodiment of FIGS. 1-6 shows a shelter that can be obtained as components and assembled onto a truck by an end-user, alternative embodiments include a shelter that is integral with a truck as assembled by a truck manufacturer or a specialized modification facility.

Referring again to FIGS. 1-4 and 6, the first and second panels 30, 32 sit atop the first and second sidewalls 24, 26, respectively, and extend generally upward from the sidewalls. The third panel 34 sits atop the third sidewall 28 at the front of the truck bed 14 and is attached to the first and second panels 30, 32 thereby strengthening these two panels and effectively increasing the volume defined by the truck bed 14. The first and second panels 30, 32 are attached to the first and second sidewalls 24, 26 respectively by first and second support stanchions 50, 52 located at the rear of the truck bed 14.

The first support stanchion 50 attaches the first panel 30 to the first sidewall 24 and provides additional strength to the first panel 30 for bearing the weight of the lid 36 when in the closed position plus the weight of any camping supplies, luggage or other items that a user may desire to store on the external surface 54 of the lid 36 when the lid 36 is closed. The second support stanchion 52 provides additional strength to the second panel 32 for bearing the weight of the lid 36 when in the closed position and for bearing the weight of the lid 36 plus a user when in the opened position. One end of a support bracket 56 extends into the second support stanchion 52 and is attached to the top of the second sidewall 26 of the truck bed 14. The other end of the bracket 56 is attached to the truck bed floor 20 so that the bracket 56 is oriented at an angle between the truck bed floor 20 and the second sidewall 26. This bracket 56 provides strength to the second sidewall 26 and offsets resulting forces associated with the weight of the lid 36 and a user resting on the lid 36 when in the opened position.

Figure 2:
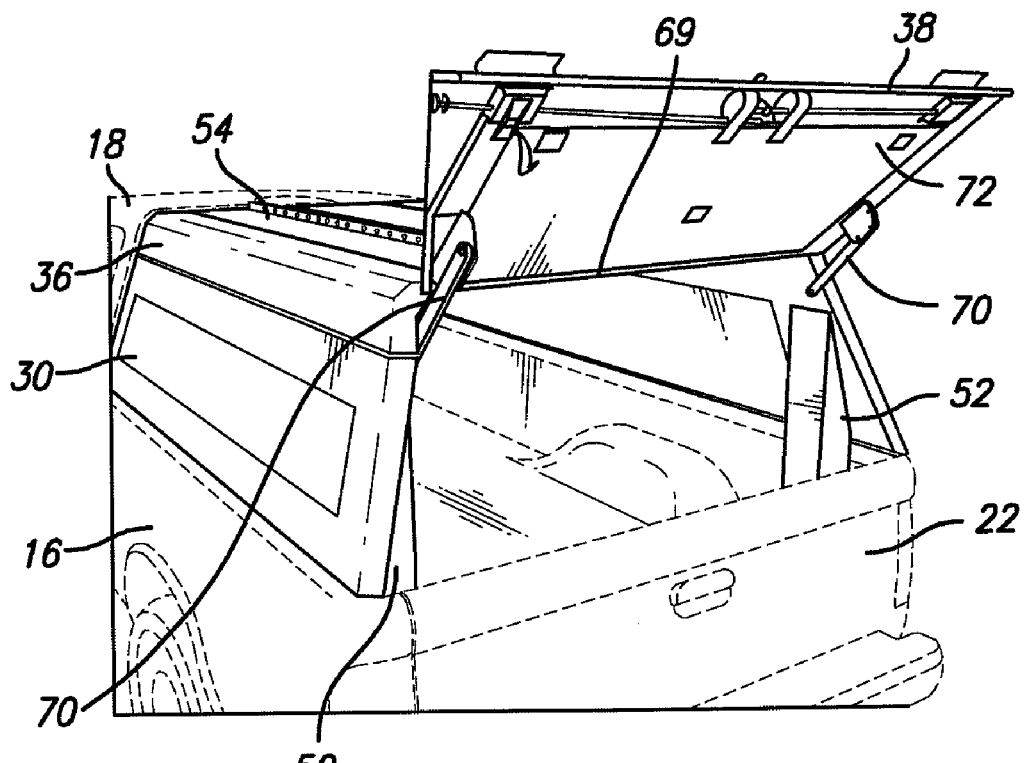
FIG. 2 is a rear perspective view of the shelter attachment of FIG. 1 in a partially-opened position.
Figure 3:
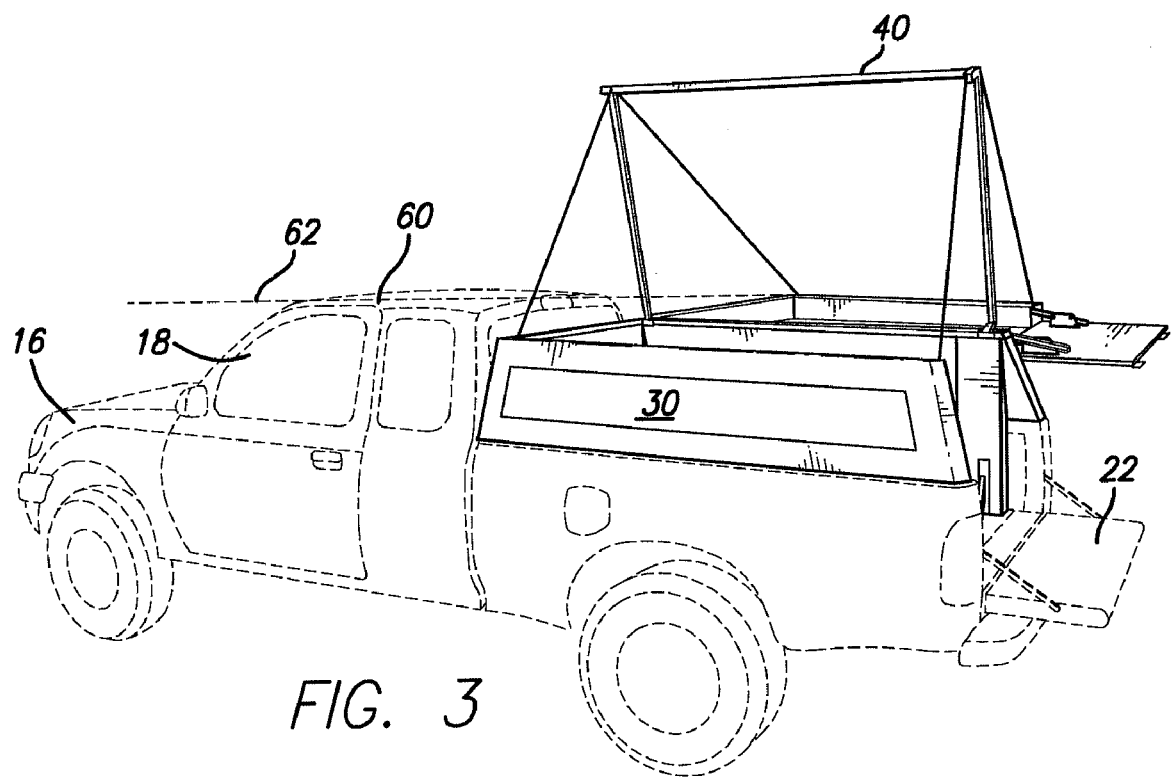
FIG. 3 is a side perspective view of the shelter attachment of FIG. 1 in a fully opened position.

The lid 36 is rotatably attached to the upper edge of the second panel 32 with a dual-axis hinge 58 (FIGS. 9-11) and rotates between a closed position as shown in FIGS. 1 and 2 and an open position as seen in FIGS. 3 and 4. When in the closed position, the end of the lid 36 that is attached to the hinge 58 rests atop the hinge 58 and the second panel 32 while the opposite end of the lid 36 rests atop the first panel 30 thus enclosing the volume of the truck bed 14. While in this closed position the lid exterior surface 54 is disposed substantially coplanar with an imaginary plane 62 extending from and defined by the cab roof 60, thus providing improved aerodynamic properties for the pick up truck 16 when it is in motion as compared with other shelter attachment designs that extend above a cab roof. When the lid 36 is in the open position, it is disposed adjacent to the second panel exterior surface 64 (FIG. 9) with the lid interior surface 66 facing generally upward and disposed generally parallel to the truck bed floor 20, and thereby becomes a sleeping bed for a user.

The hatch panel 38 is a member that is rotatably attached to the lid 36 with a hinge 68 located on one edge of the hatch panel 38 so that it rotates between a closed position and a fully opened position. When the hatch panel 38 is in its closed position (and the lid 36 is also in its closed position), the opposite edge of the hatch panel 38 abuts the rear gate 22 of the truck 16 thereby fully enclosing the volume of the truck bed 14 as best seen in FIG. 1. The shelter attachment 12 therefore does not extend rearwardly beyond the rear gate 22 thus providing improved aerodynamic properties and a more aesthetically pleasing appearance.

Referring to FIG. 2, when the hatch panel 38 moves from its fully closed position to its fully opened position, it rotates about an angle of approximately 135°, or so, and is held in its fully open position by a pair of movable brackets 70 having detents (not shown). This fully opened hatch panel 38 position provides the user with advantageous leverage, so that while standing upon the opened truck rear gate 22, the user can grasp the fully opened hatch panel 38 and lift and rotate the lid 36 clockwise to its opened position. When the lid 36 reaches its fully opened position, the hatch panel 38 can be rotated in a reverse direction to a partially opened position such that the inner surface 72 of the hatch panel 38 is generally coplanar with the inner surface 66 of the lid 36 and extends rearwardly from the lid 36 as shown in FIG. 4.

Figure 6:
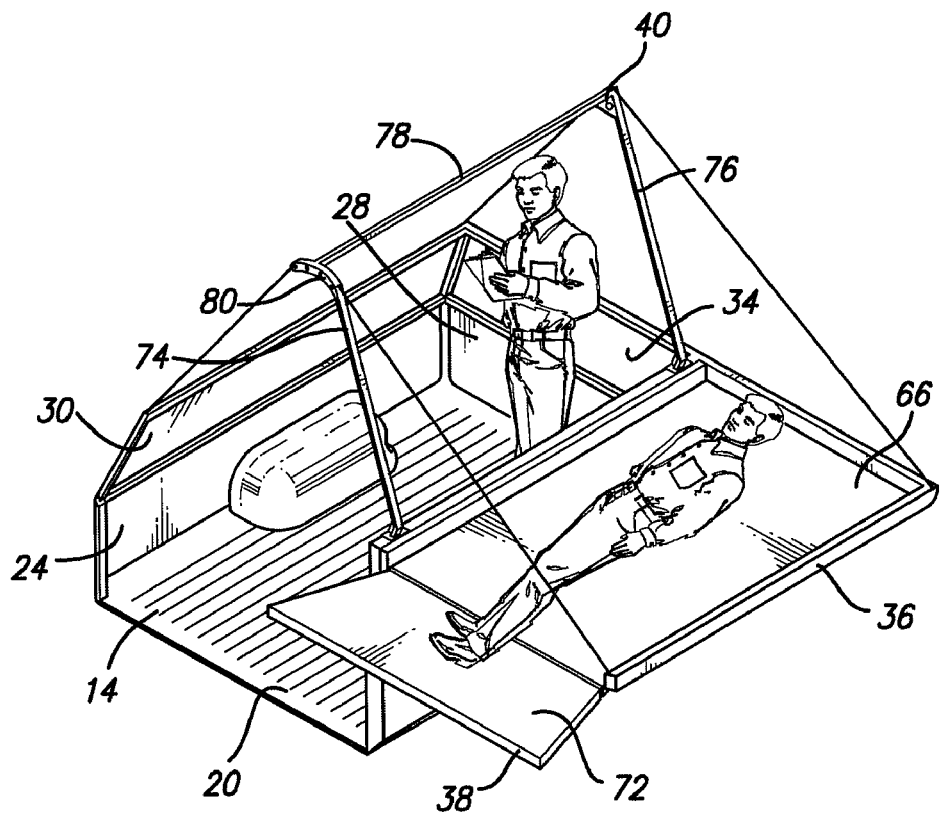
FIG. 6 is a top perspective view of certain components of the shelter attachment of FIG. 1.

Additional detents (not shown) in the movable brackets 70 secure the hatch panel 38 in this partially opened position thus extending the length of the sleeping bed beyond the length of the pickup truck bed 14. This allows the shelter attachment 12 to be mounted and carried on a pickup truck having a so-called "short bed" design (e.g., those having truck bed lengths of about 6 feet, or so), yet provide a sleeping bed with sufficient length for comfortable use by most adult users, as best seen in FIG. 6.

The mast 40 is comprised of a rearward elongated member 74 and a forward elongated member 76 that are disposed generally parallel to one another in a spaced-apart relationship and are connected to each other at one end by a mast longitudinal member 78 that extends generally parallel to the longitudinal centerline of the truck 16. The other end of each of the rearward and forward elongated members 74, 76 is rotatably attached to the second panel 32 by the dual-axis hinge 58, thereby permitting the mast 40 to rotate between a lowered position and a raised position. An end portion 80 of the rearward elongated member 74 includes the attachment point for the mast longitudinal member 78 and is bent or curved inward in a direction toward the longitudinal centerline of the truck 16.

When in the lowered position, the mast 40 is disposed between the lid interior surface 66 and the pickup truck bed floor 20 for convenient storage. When the mast 40 is in its raised position (with the lid 36 in its open position), the mast 40 is in a generally upright orientation with its longitudinal member 78 positioned well above the imaginary plane 62 formed by the roof 60 of the truck cab 18. Although in a generally upright orientation, the mast 40 nevertheless is tilted inward slightly. This orientation in combination with the inward bend or curve of the end portion 80 of the rearward elongated member 74 provides for a more open area in which a user may enter the shelter attachment and stand without suffering interference from wire ropes or tenting material.

As best seen in FIG. 4, two of the wire ropes 42, 44 are used to connect the lid 36 to the mast 40 and the other two wire ropes 46, 48 are used to connect the mast 40 to the first panel 30. The four ropes 42, 44, 46, 48 are connected to the mast 40 at or near the opposite ends of the longitudinal member 78 and provide support for the lid 36 when it is in its fully opened position. Thus the weight of the lid 36 and any user resting thereon produce a rotational force against the upper portion of the mast 40 in an outward direction away from the truck bed 14. However the two wire ropes 46, 48 connecting the mast 40 to the first panel 30 oppose this force and keep the mast 40 in its generally upright orientation so that the lid 36 remains in a generally horizontal orientation for use as a sleeping bed. The four wire ropes 42, 44, 46, 48 along with the mast 40 are additionally used to support a flexible, sheet material, such as canvas, nylon, etc., or to support inflatable material, so that a camping tent-like enclosure can be easily constructed.

Figure 7:
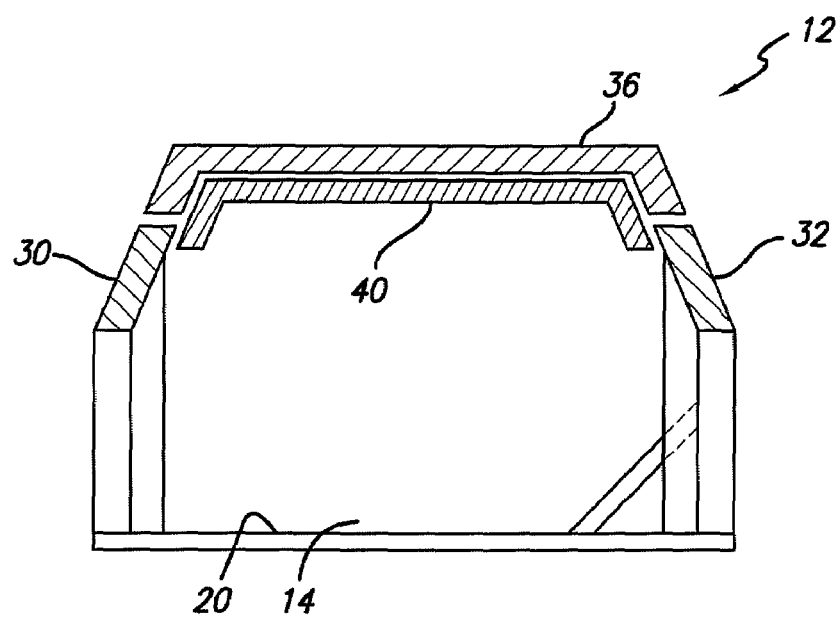
FIG. 7 is a simplified, schematic cross section view of a portion of the shelter attachment of FIG. 1 in a fully closed orientation.
Figure 8:
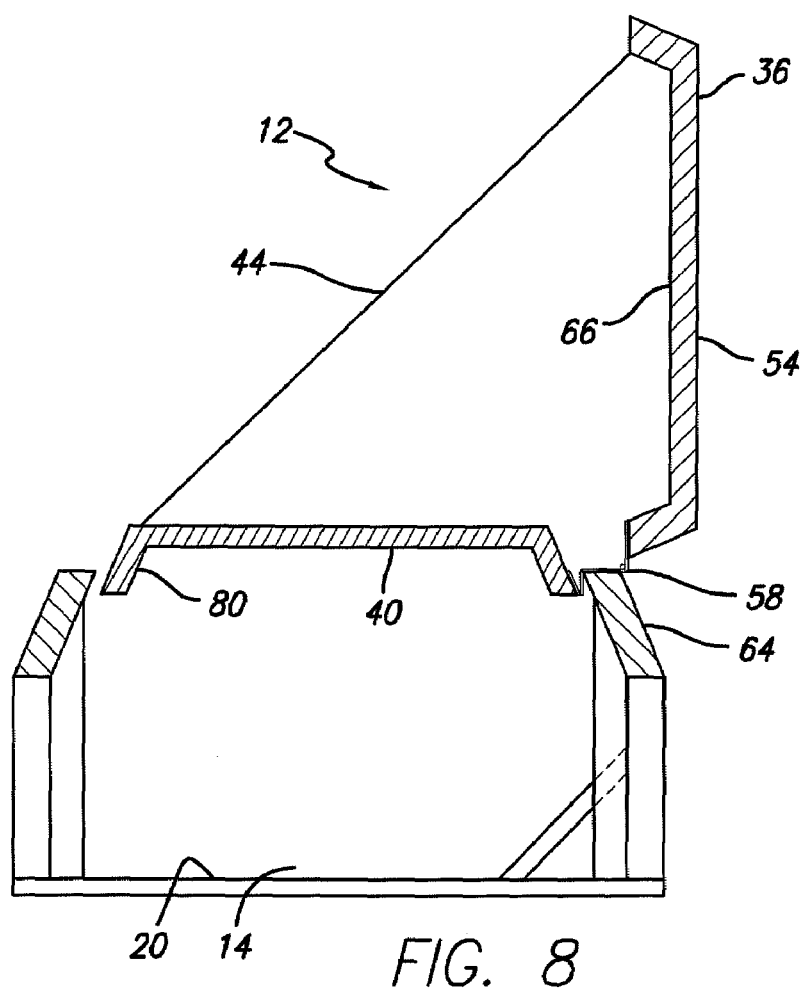
FIG. 8 is a simplified, schematic cross section view of a portion of the shelter attachment of FIG. 1 in a partially opened orientation.

The wire ropes 42, 44, 46, 48 assist in the erection of the shelter attachment 12 when it is desired to construct the enclosure. Referring now to FIG. 7, there is shown a simplified, schematic cross-section view of a portion of the shelter attachment 12 when in its fully closed position. Shown is the lid 36 resting on the first and second panels 30, 32 thereby forming an enclosure over the truck bed 14. Nested between the lid 36 and the truck bed floor 20 is the mast 40 which is disposed in its lowered or stored position. FIG. 8 shows the lid 36 in a partially opened position as it rotates clockwise toward its fully-opened position. Two of the wire ropes 42, 44 (only one of which is shown in the cross-section view of FIG. 8) become taut and cause the mast 40 to rotate clockwise from its lowered position to its raised position in response to the movement of the lid 36.

Figure 9:
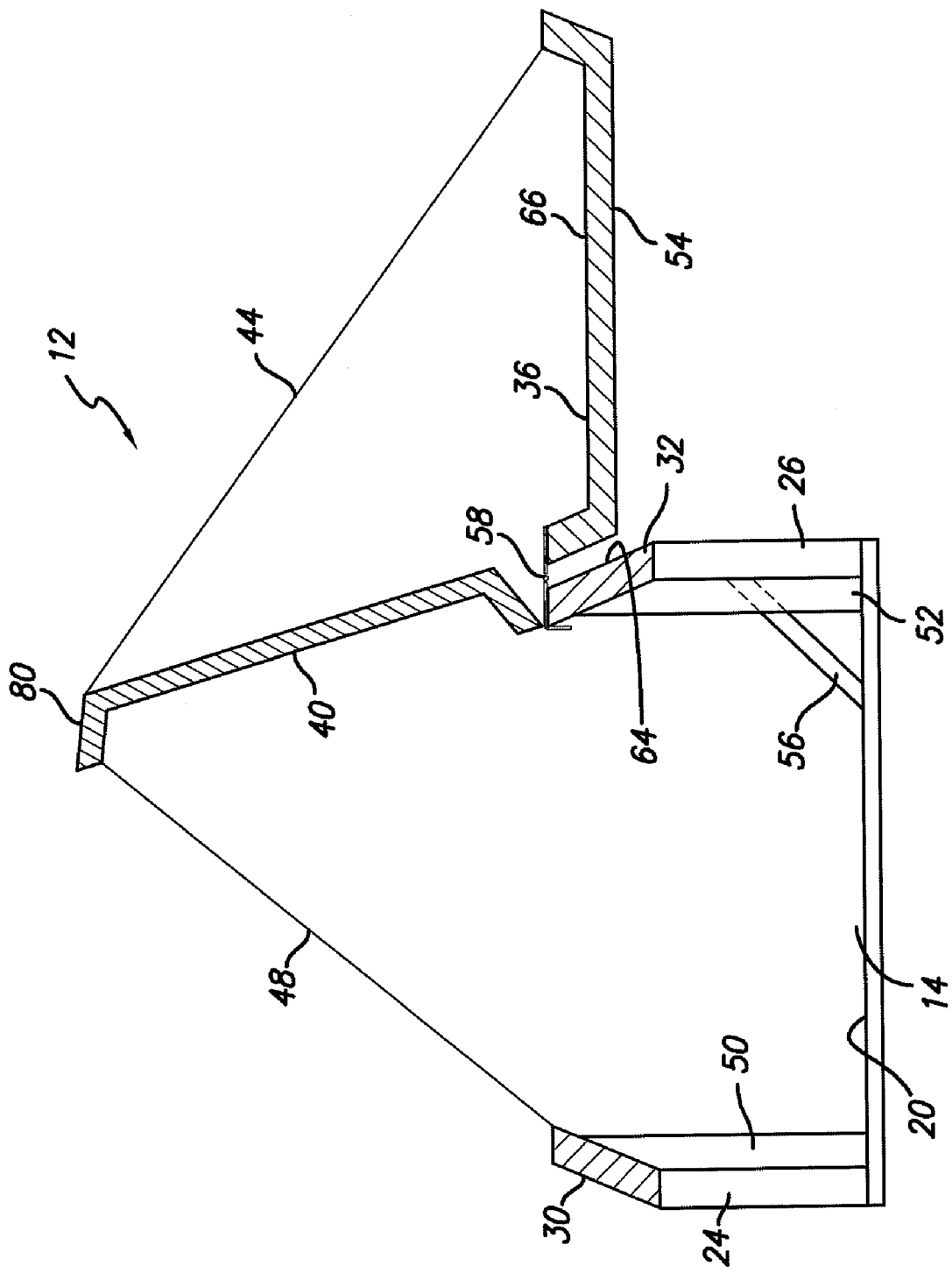
FIG. 9 is a simplified, schematic cross section view of a portion of the shelter attachment of FIG. 1 in a fully opened orientation.

FIG. 9 shows the shelter attachment 12 in its fully opened position with the lid 36 disposed adjacent to the exterior surface 64 of the second panel 32, the mast 40 disposed in its raised position and two wire ropes 44, 48 (only one of which is seen in FIG. 9) connecting the lid 36 with the mast 40 and the mast 40 with the first panel 30, and thereby providing support for the weight of the lid 36 and a user (not shown) who may desire to use the lid 36 as a sleeping bed.

This arrangement provides the needed structural support without the necessity of a crossbar extending laterally across the rear entryway of the truck bed 14 thereby hindering access by a user. The illustrated embodiment is, in effect, a cantilever structural system wherein the second support stanchion 52 attached to the second panel 32 in combination with the support bracket 56 attached to the second sidewall 26 act to counter the sideways force translated from the downward force associated with the weight of the lid 36 and a user resting on the lid 36.

While the illustrated embodiment of FIGS. 1-9 shows the use of four wire ropes 42, 44, 46, 48 as link members for supporting the lid 36 and mast 40, alternative embodiments use two wire ropes, one at each end of the longitudinal member 78 of the mast 40. Each of the two wire ropes extends from the lid 36 to the mast 40 and then on to the first panel 30 as one continuous rope. Each rope is secured in any fashion at the mast 40 so that it does not move or slip relative to the rope. In other embodiments, the wire ropes are replaced by other flexible link members, such as for example, straps, chains, cords, fiber ropes, etc. In yet further embodiments, rigid link members, such as for example, poles, rods, etc., can be substituted for the wire ropes.

Figure 10:
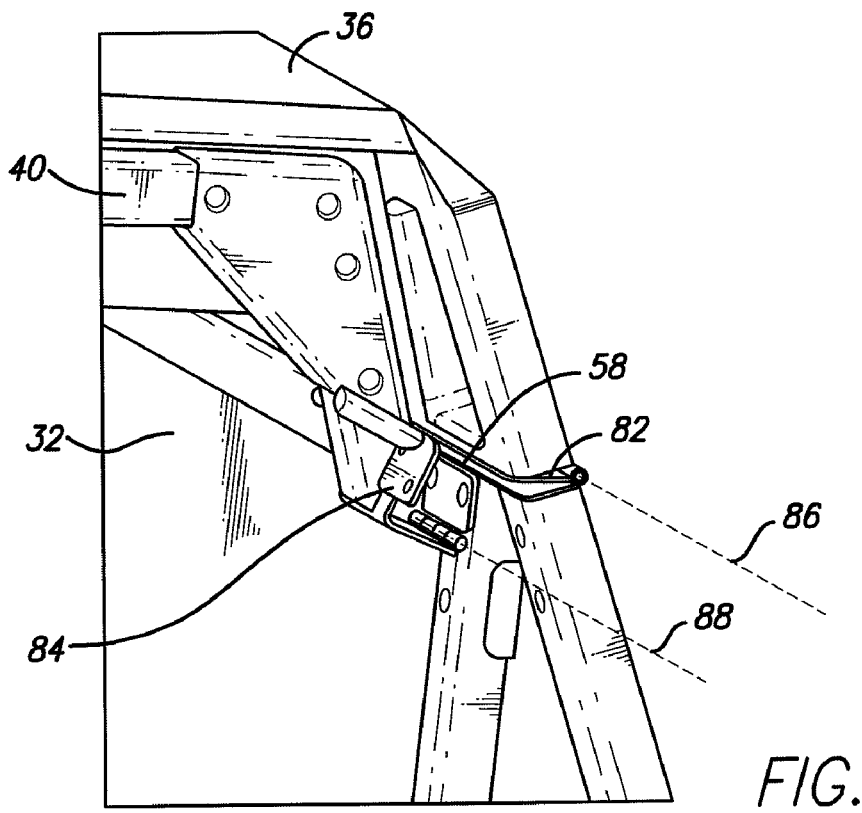
FIG. 10 is a perspective view of a dual axis hinge in the closed position in accordance with an embodiment of the invention.
Figure 11:
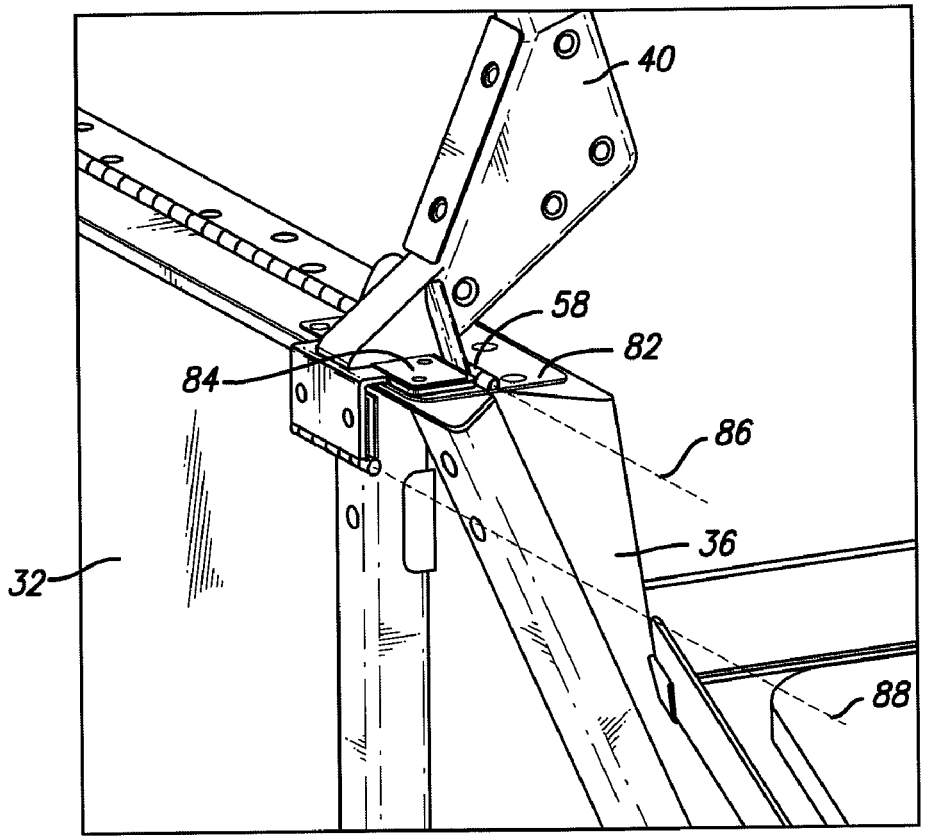
FIG. 11 is a perspective view of the dual axis hinge of FIG. 10 in the opened position.

FIG. 10 shows the dual axis hinge 58 when the mast 40 and the lid 36 are both in their closed position, whereas FIG. 11 shows the dual axis hinge 58 when the mast 40 and lid 36 are both in their raised or opened position, respectively. The hinge 58 permits both the lid 36 and the mast 40 to separately rotate relative to the second panel 32. The hinge 58 is attached to the second panel 32 and has two movable plates 82, 84, the first 82 of which rotates about a first axis 86 and the second 84 of which rotates about a second axis 88 that is parallel to the first axis 86. The first movable plate 82 is attached to the lid 36, and the second movable plate 84 is attached to the mast 40. The second plate 84 is oriented so that it does not interfere with the lid 36 and the first plate 82 when the lid 36 is closed.

When the lid 36 is opened and the mast 40 in the upright position as shown in FIG. 11, the second plate 84 is supported by the second panel 32 thereby bearing the weight of the mast 40. When the mast 40 swings into the upright position, the hinge arrangement allows the mast 40 to swing in the area previously occupied by the lid 36 and the first plate 82 when the lid 36 was closed. Thus provided for the mast 40 is a strong, weight-bearing surface that moves out of the way of the lid 36 and the first plate 82 when the lid 36 is closed.

In operation, a user lowers the rear gate 22 of the truck bed 14 and stands upon the gate 22. Then the hatch panel 38 is moved from its fully closed position through an angle of about 135°, or so, to its fully opened position and secured in that position with the pair of movable brackets 70. Next, the lid 36 is rotated or moved from its closed position over the truck bed 14 to its opened position so that the lid 36 is disposed adjacent to the exterior surface 64 of the second panel 32 with the lid interior surface 66 being disposed generally parallel to the truck bed floor 20.

As the lid 36 is being moved or rotated, the mast 40 is moved from its lowered position to its raised position in response to the force exerted by the movement of the lid 36 and by the wire ropes 42 44 attaching the lid 36 to the mast 40. When the lid 36 is in the opened position, the hatch panel 38 is moved from its fully opened position to an interim position and held into place at this position by the movable brackets 70. When the hatch panel 38 is in its interim position, the interior surface 72 of the hatch panel 38 is generally coplanar with the lid interior surface 66 thereby effectively increasing the length of the sleeping bed formed by the lid 36 and the hatch panel 38. Finally, flexible sheets constructed of canvas, nylon, etc. are placed over and secured to the mast 40, wire ropes 42, 44, 46, 48, lid 36 and hatch panel 38 thereby forming the enclosure. When it is desired to collapse the shelter attachment, the above-described actions are essentially reversed.

Thus disclosed is an improved shelter attachment for use with a pickup truck. This allows for an aerodynamic, low-weight and aesthetically-pleasing profile when the shelter attachment is closed, yet provides a quickly-assembled shelter having a comfortable sleeping area when opened.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. An apparatus for use with a bed of a pickup truck, the bed having a floor, a first sidewall and a second sidewall, wherein the second sidewall has a sidewall exterior surface and a sidewall interior surface, the apparatus comprising:
   a lid having a lid exterior surface and a lid interior surface and adapted for attachment to the second sidewall and for movement between a lid first position and a lid second position;
   a first member having a first member exterior surface and a first member interior surface and adapted for attachment to the lid and for movement between a first member first position and a first member second position,
      wherein the lid is disposed adjacent to the sidewall exterior surface with the lid interior surface disposed generally parallel to the truck bed floor when the lid is in the lid second position, and
      wherein the first member interior surface is generally coplanar with the lid interior surface when the lid is in the lid second position and when the first member is in the first member second position;
   a mast adapted for attachment to the pickup truck bed and for placement in a mast first position and a mast second position, and wherein the mast is disposed in a generally upright orientation when the mast is in the mast second position; and
   a link member adapted for connecting the lid to the mast, for connecting the mast to the pickup truck bed, and for supporting the lid when the lid is in the lid second position.

2. The apparatus of claim 1 wherein the mast is adapted to be disposed between the lid interior surface and the pickup truck bed floor when the mast is in the mast first position and the lid is in the lid first position.

3. The apparatus of claim 1 wherein the mast being adapted for attachment to the pickup truck bed includes being adapted for attachment to the second sidewall.

4. The apparatus of claim 1 wherein the link member being adapted for connecting the mast to the pickup truck bed includes being adapted for connecting the mast to the first sidewall.

5. The apparatus of claim 1 wherein the link member is flexible.

6. The apparatus of claim 5 wherein the flexible link member is a wire rope.

7. The apparatus of claim 5 wherein the flexible link member is further adapted for moving the mast from the mast first position to the mast second position in response to the movement of the lid from the lid first position to the lid second position.

8. The apparatus of claim 1 further comprising:
   a second member adapted for attachment to the first sidewall and for extending generally upward from the first sidewall, wherein the link member being adapted for connecting the mast to the pickup truck bed includes being adapted for connecting the mast to the second member; and
   a third member having a third member interior surface and a third member exterior surface and adapted for attachment to the second sidewall and for extending generally upward from the second sidewall,
      wherein the lid being adapted for attachment to the second sidewall includes being adapted for attachment to the third member, and wherein the lid being disposed adjacent to the sidewall exterior surface when the lid is in the lid second position includes being disposed adjacent to the third member exterior surface when the lid is in the lid second position.

9. The apparatus of claim 8 wherein the pickup truck has a cab with a cab roof, wherein the cab roof defines an imaginary plane extending from the cab roof, and wherein the lid exterior surface is disposed one of substantially coplanar with the imaginary plane and below the imaginary plane when the lid is attached to the third member and in the lid first position.

10. The apparatus of claim 1 wherein the link member is comprised of a first link member and a second link member, wherein the first link member is adapted for connecting the lid to the mast and wherein the second link member is adapted for connecting the mast to the pickup truck bed.

11. The apparatus of claim 1 wherein the mast being adapted for attachment to the pickup truck bed includes being adapted for attachment to the second sidewall, the apparatus further comprising:

a hinge assembly adapted for attachment to the second sidewall, wherein the hinge assembly has a first movable plate adapted to rotate about a first axis and a second movable plate adapted to rotate about a second axis, wherein the first movable plate is adapted for attachment to the lid, and wherein the second movable plate is adapted for attachment to the mast.

12. An apparatus for use with a bed of a pickup truck, the bed having a floor, a first sidewall and a second sidewall, the apparatus comprising:

a first member adapted for attachment to the first sidewall and for extending generally upward from the first sidewall;

a second member adapted for attachment to the second sidewall and for extending generally upward from the second sidewall, wherein the second member has a second member interior surface and a second member exterior surface;

a lid having a lid exterior surface and a lid interior surface and adapted for rotatable attachment to the second member and for movement between a lid first position and a lid second position;

a third member having a third member exterior surface and a third member interior surface and adapted for rotatable attachment to the lid and for movement between a third member first position and a third member second position, wherein the lid is disposed adjacent to the second member exterior surface with the lid interior surface disposed generally parallel to the truck bed floor when the lid is in the lid second position, and wherein the third member interior surface is generally coplanar with the lid interior surface when the lid is in the lid second position and when the third member is in the third member second position;

a mast adapted for rotatable attachment to the second member and for movement between a mast first position and a mast second position, wherein the mast is disposed between the lid interior surface and the pickup truck bed floor when the mast is in the mast first position and the lid is in the lid first position, and wherein the mast is disposed in a generally upright orientation when the mast is in the mast second position; and a flexible member adapted for connecting the lid to the mast, for connecting the mast to the first member, and for supporting the lid when the lid is in the lid second position.

13. The apparatus of claim 12 wherein the flexible member is a wire rope.

14. The apparatus of claim 12 wherein the flexible member is comprised of a first flexible member and a second flexible member, wherein the first flexible member is adapted for connecting the lid to the mast, and wherein the second flexible member is adapted for connecting the mast to the first member.

15. The apparatus of claim 12 wherein the pickup truck has a cab with a cab roof, wherein the cab roof defines an imaginary plane extending from the cab roof, and wherein the lid exterior surface is disposed one of substantially coplanar with the imaginary plane and below the imaginary plane when the lid is attached to the second member and in the lid first position.

16. The apparatus of claim 12 wherein the flexible member is further adapted for moving the mast from the mast first position to the mast second position in response to the movement of the lid from the lid first position to the lid second position.

17. The apparatus of claim 12 further comprising a hinge assembly adapted for attachment to the second member, wherein the hinge assembly has a first movable plate adapted to rotate about a first axis and a second movable plate adapted to rotate about a second axis, wherein the first movable plate is adapted for attachment to the lid, and wherein the second movable plate is adapted for attachment to the mast.

18. A method of erecting a support structure on a bed of a pickup truck, the bed having a floor, a first sidewall and a second sidewall, the support structure being adapted to support a cover, the method comprising:

moving a first member from a first member first position to a first member second position, wherein the first member is attached to a lid;

moving the lid from a lid first position to a lid second position, wherein the lid has a lid interior surface and a lid exterior surface, wherein the lid is attached to a second member having a second member interior surface and a second member exterior surface and wherein the second member is attached to the second sidewall and extends generally upward from the second sidewall;

moving a mast from a mast first position to a mast second position, wherein the mast is attached to the second member, wherein the mast is disposed between the lid interior surface and the pickup truck bed floor when the mast is in the mast first position and the lid is in the lid first position, and wherein the mast is disposed in a generally upright orientation when the mast is in the mast second position; and securing the lid in the lid second position and the mast in the mast second position with a flexible member adapted for connecting the lid to the mast and for connecting the mast to a third member, wherein the third member is attached to the first sidewall and extends generally upward from the first sidewall;

wherein the lid is disposed adjacent to the second member exterior surface with the lid interior surface being disposed generally parallel to the truck bed floor when the lid is in the lid second position, and wherein the first member interior surface is generally coplanar with the lid interior surface when the lid is in the lid second position and when the first member is in the first member second position.

19. The method of claim 18 wherein the flexible member is a wire rope.

20. The method of claim 18 wherein the flexible member is comprised of a first flexible member and a second flexible member, wherein the first flexible member connects the lid to the mast, and wherein the second flexible member connects the mast to the third member.

21. The method of claim 18 wherein the pickup truck has a cab with a cab roof, wherein the cab roof defines an imaginary plane extending from the cab roof, and wherein the lid exterior surface is disposed one of substantially coplanar with the imaginary plane and below the imaginary plane when the lid is in the lid first position.

22. The method of claim 18 wherein moving the mast from the mast first position to the mast second position includes moving the mast from the mast first position to the mast second position in response to a force exerted by the flexible member and by the movement of the lid from the lid first position to the lid second position.

23. The method of claim 18 wherein both the moving of the lid from the lid first position to the lid second position and the moving of the mast from the mast first position to the mast second position are by use of a hinge assembly attached to the second member, wherein the hinge assembly has a first movable plate adapted to rotate about a first axis and a second movable plate adapted to rotate about a second axis, wherein the first movable plate is attached to the lid, and wherein the second movable plate is attached to the mast.

24. An apparatus for use with a bed of a pickup truck, the bed having a floor, a first sidewall and a second sidewall, the apparatus comprising:

a first member adapted for attachment to the first sidewall and for extending generally upward from the first sidewall;

a second member adapted for attachment to the second sidewall and for extending generally upward from the second sidewall, wherein the second member has a second member interior surface and a second member exterior surface;

a lid attached to the second member and having a lid interior surface and a lid exterior surface;

means for supporting the lid in a position adjacent to the second member exterior surface with the lid interior surface facing in a generally upward direction and disposed generally parallel to the truck bed floor;

a third member adapted for attachment to the lid and having a third member interior surface and a third member exterior surface; and means for supporting the third member in a position wherein the third member interior surface is generally coplanar with the lid interior surface when the lid is disposed in the position adjacent to the second member exterior surface.

* * * * *